United States Patent [19]

McLaughlin

[11] Patent Number: 5,979,078
[45] Date of Patent: Nov. 9, 1999

[54] CUSHIONING DEVICE FOR A FOOTWEAR SOLE AND METHOD FOR MAKING THE SAME

[75] Inventor: Ross A. McLaughlin, Lake Oswego, Oreg.

[73] Assignee: Nike, Inc., Beaverton, Oreg.

[21] Appl. No.: 08/949,906

[22] Filed: Oct. 14, 1997

Related U.S. Application Data

[63] Continuation of application No. 08/763,038, Dec. 10, 1996, abandoned, which is a continuation of application No. 08/353,369, Dec. 2, 1994, abandoned.

[51] Int. Cl.⁶ .................................................. A43B 13/20
[52] U.S. Cl. ............................................... 36/29; 36/35 B
[58] Field of Search .................................. 36/35 B, 35 R, 36/29, 28, 93, 153, 154, 37, 71, 114, 88, 25 R; 5/449, 445, 457

[56] References Cited

U.S. PATENT DOCUMENTS

| | | | |
|---|---|---|---|
| 1,240,153 | 9/1917 | Olsen | 36/153 X |
| 1,323,610 | 12/1919 | Price | 5/449 X |
| 2,004,906 | 6/1935 | Simister | 36/29 |
| 2,546,827 | 3/1951 | Lavinthal | 36/154 |
| 2,600,239 | 6/1952 | Gilbert | 36/153 |
| 2,762,134 | 9/1956 | Town . | |
| 3,204,678 | 9/1965 | Worcester | 5/449 X |
| 3,469,576 | 9/1969 | Smith et al. . | |
| 3,568,227 | 3/1971 | Dunham | 5/457 |
| 4,183,156 | 1/1980 | Rudy . | |
| 4,217,705 | 8/1980 | Donzis | 36/29 |
| 4,219,945 | 9/1980 | Rudy | 36/29 |
| 4,271,606 | 6/1981 | Rudy . | |
| 4,305,212 | 12/1981 | Coomer . | |
| 4,817,304 | 4/1989 | Parker et al. | 36/29 X |
| 4,936,029 | 6/1990 | Rudy . | |
| 5,044,030 | 9/1991 | Balaton | 5/455 |
| 5,199,191 | 4/1993 | Moumdjian . | |
| 5,257,470 | 11/1993 | Auger et al. . | |

FOREIGN PATENT DOCUMENTS

| | | | |
|---|---|---|---|
| 2639537 | 6/1990 | France | 5/455 |
| 7226002 | 9/1972 | Taiwan . | |
| 75100322 | 1/1975 | Taiwan . | |

*Primary Examiner*—Ted Kavanaugh
*Attorney, Agent, or Firm*—Banner & Witcoff, Ltd.

[57] ABSTRACT

A cushioned shoe sole includes an outer sole layer for contacting the ground surface, a midsole layer disposed above the outer sole layer and being formed of a resilient elastomeric material, and a bladder composite which includes a first bladder inflated with a first fluid medium and having a perimeter area and a second bladder element formed around the first bladder element perimeter area and encasing the first bladder element. The first and second bladder elements are positioned within the midsole layer. In a method for forming a cushioning device in accordance with the present invention a first bladder is formed from an elastomeric material to include an interior cavity defined within a perimeter of the bladder. The first bladder is inflated under pressure, sealed, and a second bladder is then formed from an elastomeric material around the first inflated bladder.

20 Claims, 5 Drawing Sheets

5,979,078

CUSHIONING DEVICE FOR A FOOTWEAR SOLE AND METHOD FOR MAKING THE SAME

This application is a continuation of application Ser. No. 08/763,038, filed Dec. 10. 1996, which is a continuation of application Ser. No. 08/353,369, filed Dec. 12, 1994 both abandoned.

TECHNICAL FIELD

The present invention relates to a cushioning device for a sole in footwear and, more particularly, to a bladder composite formed of a primary bladder which is inflated under a first pressure and sealed, and then disposed within a secondary bladder. The present invention also relates to a method for making the cushioning device.

BACKGROUND OF THE INVENTION

Basketball, tennis, running, and aerobics are but a few of the many popular athletic activities which produce a substantial impact on the foot when the foot strikes the ground. To cushion the strike force on the foot, as well as the leg and connecting tendons, the sole of shoes designed for such activities typically include several layers, including a resilient, shock absorbent layer such as a midsole and a ground contacting outer sole or outsole which provides both durability and traction.

The typical midsole uses one or more materials or components which affect the force of impact in two important ways, i.e., through shock absorption and energy absorption. Shock absorption involves the attenuation of harmful impact forces to thereby provide enhanced foot protection. Energy absorption is the dissemination of both impact and useful propulsive forces. Thus, a midsole with high energy absorbing characteristics generally has a relatively low resiliency and, conversely, a midsole with low energy absorbing characteristics generally has a relatively high resiliency. The optimum midsole should be designed with an impact response that takes into consideration both adequate shock absorption and sufficient resiliency.

One type of sole structure in which attempts have been made to design appropriate impact response is soles, or inserts for soles, that contain a bladder element of either a liquid or gaseous fluid. These bladder elements are either encapsulated in place during the foam midsole formation or dropped into a shallow, straight walled cavity of a foam midsole and cemented in place, usually with a separate piece of foam cemented on top. Gas filled bladder elements are disclosed in U.S. Pat. Nos. 4,183,156 and 4,219,945 to Marion F. Rudy, the contents of which are hereby incorporated by reference. A bladder or barrier member is formed of an elastomer material having a multiplicity of preferably intercommunicating, chambers which are inflated to a relatively high pressure by a gas having a low diffusion rate through the bladder. The gas is supplemented by ambient air diffusing through the bladder to thereby increase the pressure therein and obtain a pressure that remains at or above its initial value over a period of years. (U.S. Pat. Nos. 4,340,626, 4,936,029 and 5,042,176 to Marion F. Rudy describe various improvements in such bladders and are also hereby incorporated by reference.) The bladder insert is incorporated into the shoe, in the '156 patent, by placement within a cavity below the upper, e.g., on top of a midsole layer and within sides of the upper or within the midsole. In the '945 patent, the bladder insert is encapsulated within a yieldable foam material, which functions as a bridging moderator filling in the irregularities of the bladder with foam pillars, providing a substantially smooth and contoured surface for supporting the foot and forming an easily handled structure for attachment to an upper. However, maintaining quality and density consistency in the pillars of foam is a difficult manufacturing task. In addition, the presence of the moderating foam detracts from the shock absorbing function of the gas inflated bladder, as well as the cushioning perception provided by the bladder. Thus, when the inflated bladder is encapsulated in a foam midsole, the favorable cushioning response characteristics of the inflated bladder are reduced by the presence of the encapsulating foam, including the pillars that fill in the irregularities of the bladder.

SUMMARY OF THE INVENTION

The present invention provides a bladder composite for use as a cushioning element in a footwear sole. The bladder composite has an outer bladder which contains a cushioning and supportive fluid and an inner bladder which also contains a cushioning and supportive fluid. The inner bladder of the bladder composite is completely encased within the outer bladder. In a preferred embodiment of the invention, the inner bladder includes a plurality of chambers in fluid communication and having a plurality of surface depressions between adjacent chambers. Since the outer bladder surrounds the inner bladder, the cushioning and supportive fluid in the outer bladder thereby fills in the plurality of surface depressions and provides a bladder composite having a generally smooth exterior contour without surface depressions. Preferably, the inner bladder is inflated to a pressure above atmospheric and the outer bladder is at atmospheric pressure. Alternatively, the outer bladder is inflated to a pressure above atmospheric, but less than the pressure within the inner bladder.

The bladder composite of the present invention eliminates the foam pillars of the prior art which formed between the surface irregularities of the bladder. Thus, less foam is utilized during manufacturing and a lighter midsole having a lesser density is produced. In addition, the generally smooth exterior contour of the bladder composite provides for greater consistency in the manufacturing of the midsole since excess foam is not needed to fill in the bladder irregularities and the bladder composite can be more readily incorporated into a midsole.

Further, the bladder composite of the present invention permits the inner and outer bladders to be inflated at different pressures, as desired, to form a multi-stage cushioning system. Thus, the lower pressure of the outer bladder gives the wearer a greater cushioning perception, yet the higher pressure of the inner bladder still absorbs the load of high impact forces.

The present invention also provides a method of forming a cushioning element which includes the steps of forming a first bladder from an elastomeric material to form an interior cavity within a perimeter of the bladder, forming a second bladder from an elastomeric material around the first bladder, inflating the first bladder, and sealing the second bladder around the first bladder.

BRIEF DESCRIPTION OF THE DRAWINGS

The above description and other objects, advantages, and features of the present invention will be more fully understood and appreciated by reference to the specification and accompanying drawings, wherein.

DETAILED DESCRIPTION OF THE PREFERRED EMBODIMENTS

Figure 1:
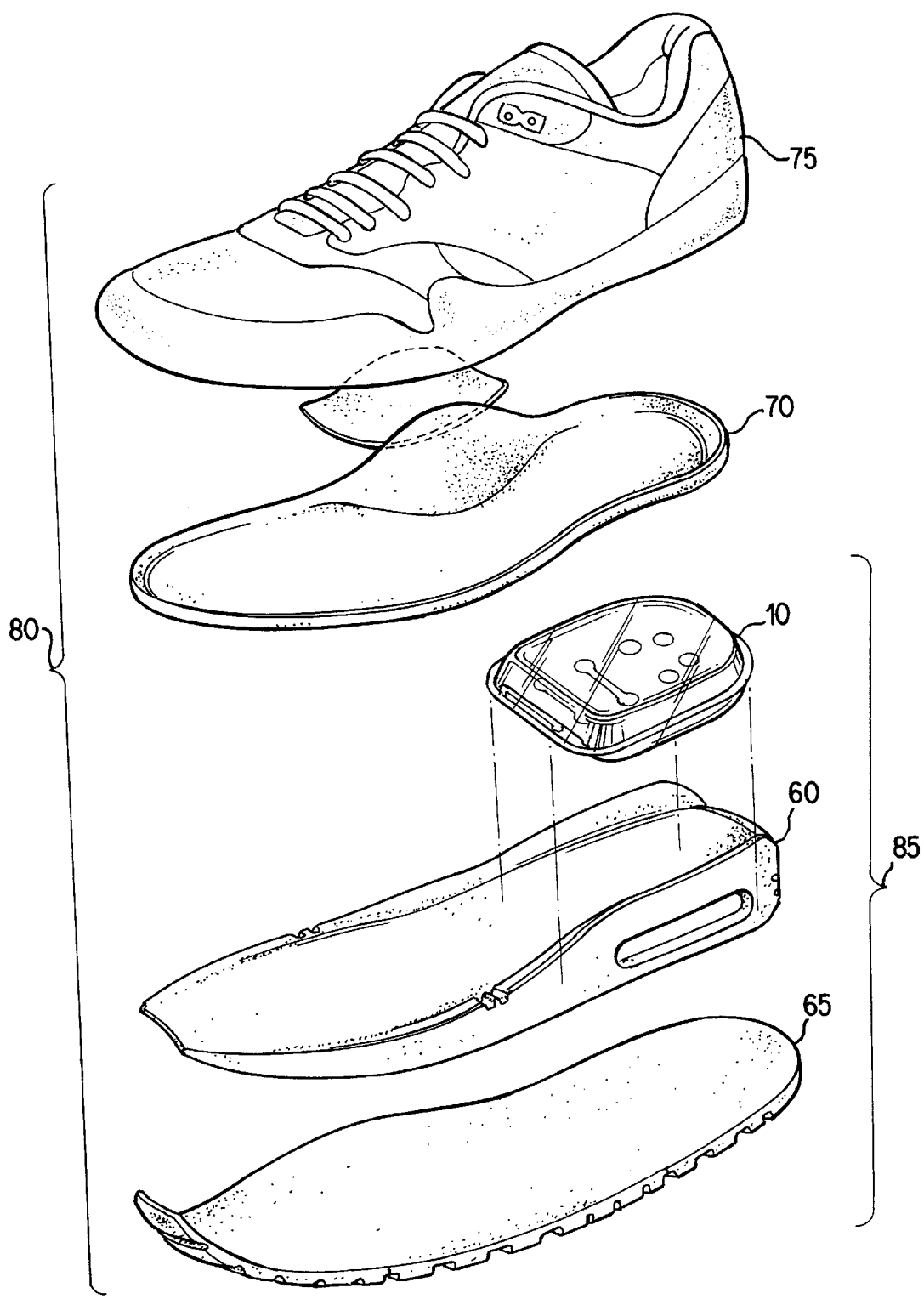
FIG. 1 is an exploded view of a shoe upper and sole including the bladder composite according to the present invention.

A bladder composite in accordance with a preferred embodiment of the present invention is illustrated generally at 10 in FIG. 1. As shown, bladder composite 10 is incorporated into midsole layer 60 and outsole layer 65 is preferably disposed therebelow to form a sole 85. A sock liner 70 is preferably placed above midsole layer 60 and a shoe upper 75 is attached above the assembled sole to form an article of footwear 80. Depending upon the midsole material and performance demands of the shoe, midsole layer 60 can also form the ground engaging surface and outsole layer 65 can therefore be omitted. Further, the shape, size, and position of bladder composite 10 is merely illustrative of one preferred embodiment. It should be obvious to one skilled in the art that bladder composite 10 can have various configurations and be positioned in the forefoot area, anywhere in between the forefoot area and heel area, or even extend the entire length of midsole 60. Likewise, the window shown in midsole 60 to allow for visibility of bladder composite 10 is merely illustrative of one preferred embodiment and can be disposed at any location and be given any desired shape.

Figure 2:
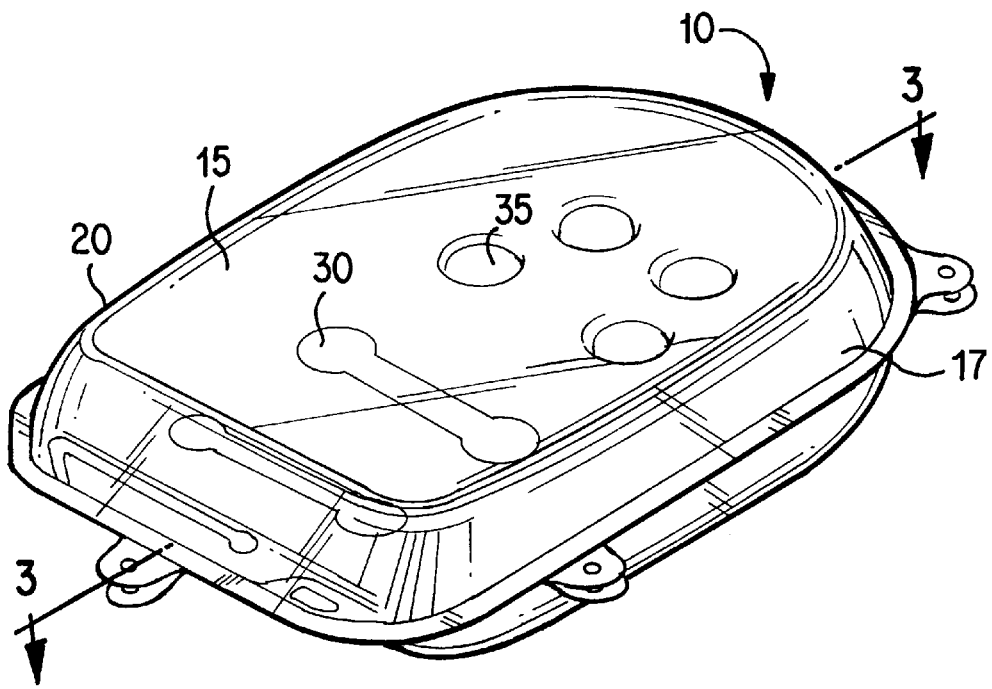
FIG. 2 is a perspective view of a bladder composite according to the present invention.
Figure 3:
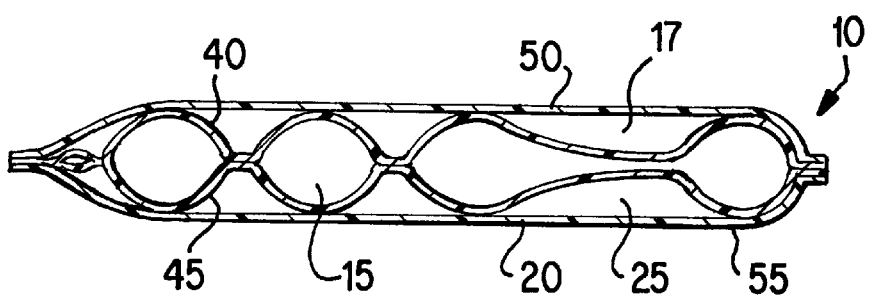
FIG. 3 is a longitudinal cross section taken through the bladder composite taken generally along line 3—3 of FIG. 2.
Figure 4:
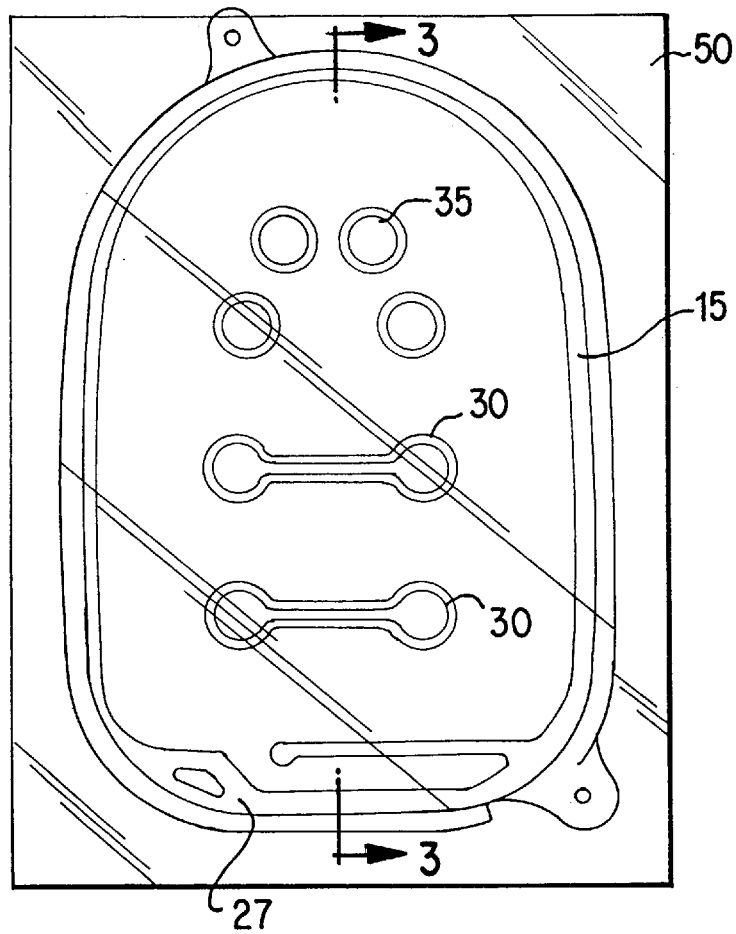
FIG. 4 is a plan view of the bladder composite prior to inflation.

Referring to FIGS. 2–4, bladder composite 10 includes a first inner bladder 15 with a second outer bladder 17 formed around and encasing inner bladder 15. Inner bladder 15 is a conventional bladder manufactured using known techniques, such as those described above for the '156 and '945 patents. Bladder 15 is formed from a thermoplastic elastomer film, such as polyester polyurethane, polyether polyurethane or the additional suitable materials identified in the '156 and '945 patents. Among the numerous thermoplastic urethanes which are particularly useful in forming the film layers are urethanes such as Pellethane™, (a trademarked product of the Dow Chemical Company of Midland, Michigan), Elastollan® (a registered trademark of the BASF Corporation) and ESTANE® (a registered trademark of the B.F. Goodrich Co.), all of which are either ester or ether based, have proven to be particularly useful. Still other thermoplastic urethanes based on polyesters, polyethers, polycaprolactone and polycarbonate macrogels can be employed. In a preferred embodiment of the present invention, bladder 15 is formed of a first sheet 40 of elastomeric film and a second sheet 45 of elastomeric film. Sheets 40 and 45 are welded to one another along their respective perimeters to define the outer perimeter of bladder 15. Bladder 15 has a plurality of weld lines and/or weld dots 30, 35 which form a plurality of intercommunicating chambers having surface depressions or irregularities therebetween. The weld dots and/or lines serve to maintain the generally flat configuration or contour of first bladder 15 after it is inflated under pressure. The shape and configuration of bladder 15 and the position and orientation of the lines 30 and dots 35 illustrated are merely for example and it should be apparent to one skilled in the art that weld lines and weld dots can be omitted entirely or placed at any given location on any shaped bladder in order to form the desired chambers.

Alternatively, bladder 15 can be formed as a circular ring with a central opening, e.g., donut-shaped, and weld lines may or may not be utilized. Further bladder 17 is formed around the donut-shaped bladder 15 such that the elastomeric film of the outer bladder extends over the central opening of bladder 15. When outer bladder 17 compresses in this embodiment of the invention, a trampoline effect is obtained through the moderation of the elastomeric film over the central opening.

The interior of bladder 15 is inflated under pressure with a gaseous fluid, for example, sulfur hexafluoride ("supergas"), air or one of the other suitable gases which are identified in the '156 and '945 patents, such as: hexafluoroethane; perfluoropropane; perfluorobutane; perfluoropentane; perfluorohexane; perfluoroheptane; octafluorocyclobutane; perfluorocyclobutane; hexafluoropropylene; tetrafluoromethane; monochloropentafluoroethane; 1, 2-dichlorotetrafluroethane; 1, 1, 2-trichloro-1, 2, 2 trifluoroethane; chlorotrifluoroethylene; bromotrifluoromethane; and monochlorotrifluoromethane. These gases may all be termed supergases. Weld lines 30 and/or weld dots 35 are formed in a conventional manner and first inner bladder 15 is inflated at a first predetermined pressure with a gaseous fluid as set forth above. In a preferred embodiment of the present invention, bladder 15 is formed from a generally transparent or translucent elastomeric film to enable visibility through the bladder and it is inflated with sulfur hexafluoride to provide a consistent and enduring inflation pressure.

In an alternative embodiment of the present invention inner bladder 15 is formed using conventional blow-molding techniques. In such case, however, weld dots and/or lines are still used in order to maintain the desired generally flat configuration or contour of the first bladder.

Outer bladder 17 is formed by a second layer of elastomeric film 20 which is then welded around inflated bladder 15. As illustrated in FIG. 3, a top sheet 50 and a bottom sheet 55 forming second layer 20 are welded to one another at the outer perimeter weld of bladder 15 to form secondary chamber 25. Thus, sheets 40 and 45 of the inner bladder and sheets 50 and 55 of the outer bladder have a common perimeter weld defining the outer perimeter of bladder composite 10. Preferably, the elastomeric film used for outer bladder 17 is thermoplastic urethane. The elastomeric material outer bladder 17 can also be a thinner, less expensive material than that utilized for bladder 15, however, because the strength requirements for secondary chamber 25 are minimal because lower gas pressures are utilized.

Figure 5:
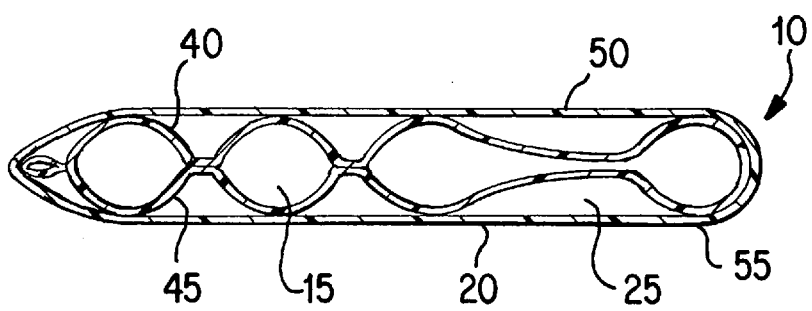
FIG. 5 is a longitudinal cross section of a bladder composite according to another embodiment of the present invention.

In another embodiment of the present invention, bladder 15 can be, in essence, shrink-wrapped within second layer of film 20, as illustrated in FIG. 5. In both cases, secondary chamber 25 is preferably sealed with ambient air therein and is thus at a pressure less than that contained in first bladder 15. In a further preferred embodiment, outer bladder 17 is inflated through inlet valve 27 to a second predetermined pressure with a gaseous fluid, such as air or those listed above for inner bladder 15. The gaseous fluid contained in secondary chamber 25 thus fills the irregularities or depressions between the inflated chambers of bladder 15. In a further embodiment of the invention, secondary chamber 25 is not completely sealed or inflated under pressure but still eliminates the foam pillars and achieves the benefits therefrom just by surrounding bladder 15.

Figure 6:
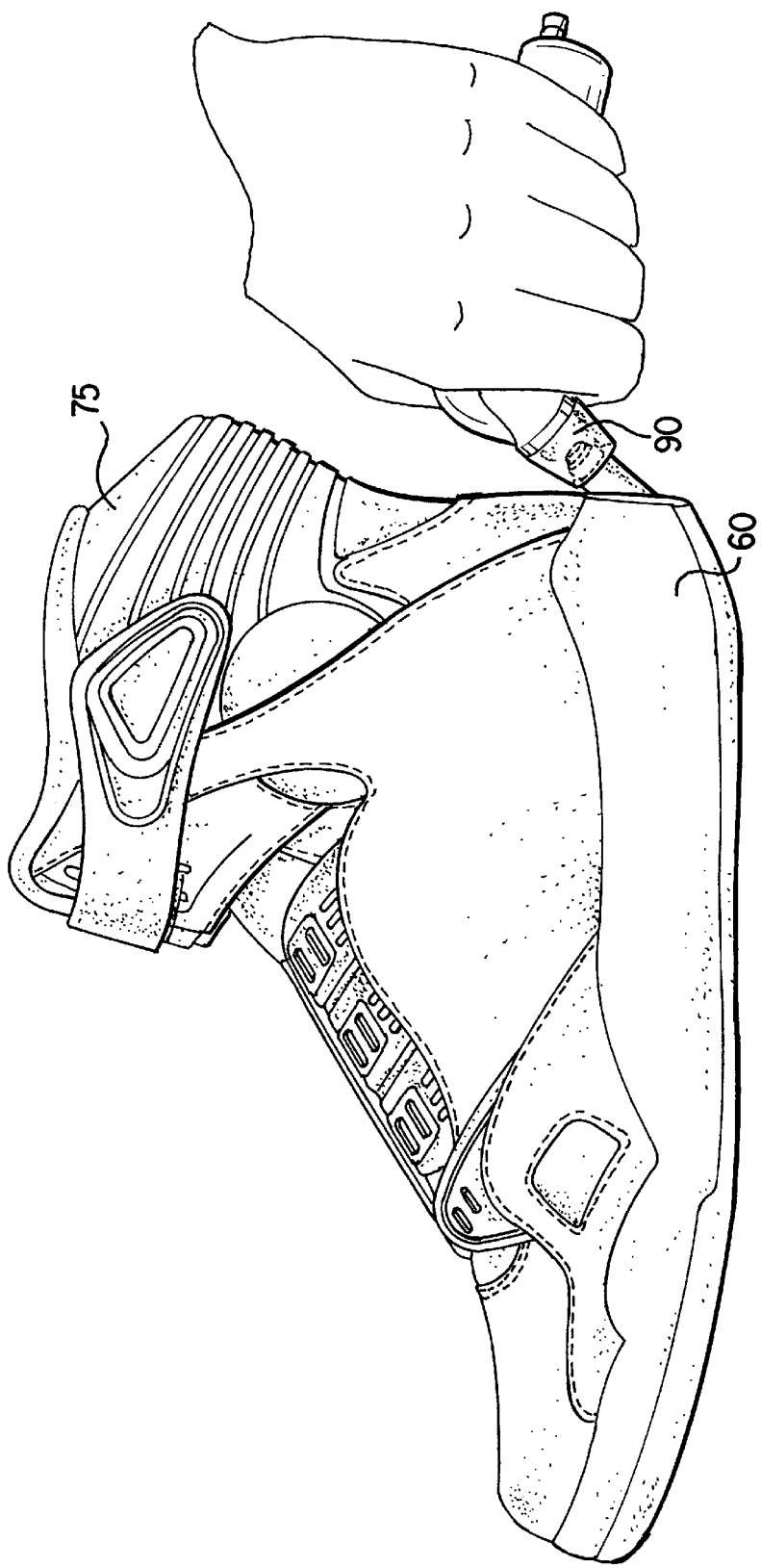
FIG. 6 illustrates a further embodiment of the invention.

Alternatively, as shown in FIG. 6, the inlet valve can connect to a pump 90 that is disposed externally to the shoe sole. Pumps of this nature are disclosed in U.S. Pat. No. 5,257,240 the contents of which are hereby incorporated by reference. Thus, the wearer can manually inflate outer bladder 17 within midsole 60 to the desired pressure, which in turn changes the overall height, feel and stiffness of the shoe. Further, on inflation pump 90 can be provided on each side of the shoe to separately inflate the medial and lateral chambers of outer bladder 17. By so doing, the "cant" or touchdown angle of the shoe can be adjusted in order to compensate or correct gait irregularities or over pronation. Preferably, outer bladder is inflated to 1–3 p.s.i. whereas inner bladder 15 stays constant at approximately 20–30 p.s.i.

The formation of multiple internal chambers, e.g., bladder element 15 and outer bladder 17, thereby permits the separate chambers to be pressurized at various desirable pressures and the development of a multi-stage cushioning system. First inner bladder 15 is inflated to a higher pressure than that contained with second outer bladder 17. Inner bladder 15 is inflated to a pressure between 5 and 30 p.s.i., preferably between 20 p.s.i. and 30 p.s.i., whereas outer bladder 17 is maintained between atmospheric pressure and 15 p.s.i., preferably less than 5 p.s.i.

Further, it is also within the scope of the present invention to utilize more than two internal chambers, e.g., inner bladder 15 inflated to 25 p.s.i., outer bladder 17 inflated to 2 p.s.i., and a further bladder formed around the bladder composite and maintained at atmospheric pressure. Thus, a multi-stage cushioning system can be formed from as many internal chambers as desired, depending upon the end use of the bladder composite and the specific needs of the user.

Figure 7:
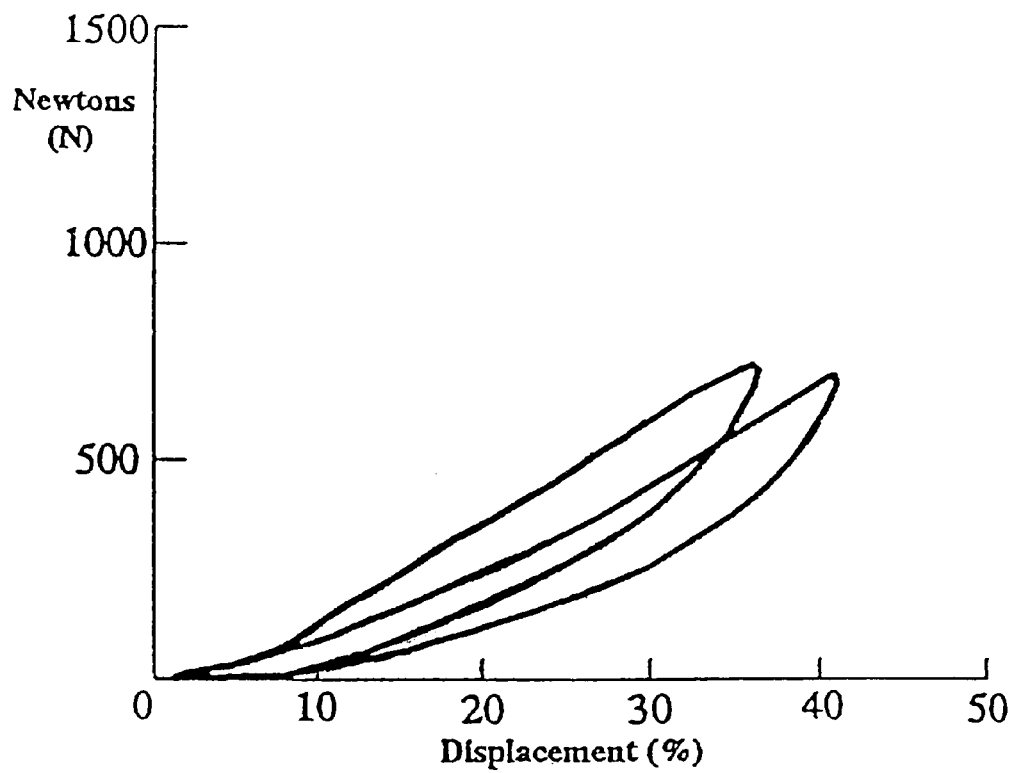
FIG. 7 is a Graph illustrating the load deflection curves of a midsole including a conventional bladder and a midsole including a bladder according to the present invention.

Bladder composite 10 in accordance with the present invention also permits an increased volume of air to be employed versus standard prior art bladders. For example, a standard air bladder has a volume of approximately 28.4 cm$^3$ in the heel area of the midsole. In comparison, bladder composite 10 can be inflated in a first manner to a volume of approximately 45.4 cm$^3$ and in a second manner to a volume of 61.5 cm$^3$, depending upon the gaseous fluid and pressure contained within second outer bladder 17. The inflated volume of inner bladder 15 remains generally fixed at 28.4 cm$^3$. Overall, bladder composite 10 yields an air volume increase of 59% and 116%, respectively, depending upon whether a generally flat, "skinny" bladder or a bulging, "puffy" bladder is desired. Thus, the superior cushioning benefits of "air" are more perceptible to the wearer due to the elimination of the foam pillars between the inflated chambers and the low pressure, increased volume of gaseous fluid in outer bladder 17. The higher pressure within inner bladder 15, however, still absorbs the high impact forces from each foot strike on the ground. Thus, as the applied pressure increases, the lower pressure in outer bladder 17 builds and then, during full compression, the higher pressure in bladder element 15 acts to cushion the load and absorb the high impact forces. The cushioning system of the present invention therefore deflects the load at a more gradual, steady rate, as illustrated in FIG. 7. In FIG. 7, A represents the load deflection curve of the heel area of a midsole including 0.34 s.g. PU with a standard bladder, and B represents the load deflection curve of the heel area of a midsole including 0.34 s.g. PU with bladder composite 10.

Referring to FIG. 1, midsole layer 60 is molded from a foam material, preferably polyurethane, having a preferred specific gravity, such as 0.34 grams/cm$^3$ or 0.38 grams/cm$^3$ for example. Bladder composite 10 is preferably encapsulated within midsole layer 60 and then assembled with outsole layer 65, sock liner 70 and shoe upper 75 to produce a completed article of footwear 80. When conventionally encapsulating an air bladder into a polyurethane midsole it was important that the foam material completely fill-in around the multi-chamber air bladder in order to form a moderator for the peaks and valleys in the bladder, as well as to secure the bladder in place. In order to accomplish this consistently and with the fewest number of rejected midsoles (containing the more costly air bladders therein), it was necessary to mold the midsole with an excess of foam. This increased foam insured a complete fill around the bladder, but it also increased the midsole density and thereby detracted from the compliancy of the midsole and reduced the wearer's perception of the air bladder. In contrast, the present invention reduces the amount of required foam by filling the depressions or valleys between intercommunicating chambers in bladder 15 with the gaseous fluid of outer bladder 17. Therefore, since bladder composite 10 eliminates the foam between the peaks and valleys, it is no longer necessary to use an excess of foam to insure complete fill-in and a lighter midsole having a lesser density is produced. In addition, an improved polyurethane flow around bladder composite 10 is obtained when pouring the midsole into the mold and the manufacturing of midsole 60 is thus improved over the prior art. Alternatively, bladder composite 10 can be stock fit within a preformed opening in midsole 60 and generally comparable benefits are obtained.

It will be obvious to those of ordinary skill in the art that numerous modifications may be made without departing from the true spirit and scope of the present invention, which is to be limited only by the appended claims.

I claim:

1. An article of footwear comprising an upper and a sole; said sole including a bladder composite;

said bladder composite comprising;

a first bladder element formed of elastomeric material and having a top surface, a bottom surface and a perimeter area, said first bladder being sealed and containing a fluid which spaces the top and bottom surfaces from one another, at least one of the top and bottom surfaces having at least one depression formed in it to constrain the expansion of the top and bottom surfaces; and a second bladder element formed around said first bladder element, said second bladder element being formed of elastomeric material and having top and bottom surfaces substantially devoid of depressions and a perimeter area, said second bladder element defining a sealed enclosure containing a fluid and encasing said first bladder element;

wherein said bladder composite is capable of withstanding concentrated and repetitive high impact loads occurring with footstrike.

2. An article of footwear according to claim 1 wherein said fluid within said first bladder element is a gaseous substance at a pressure above atmospheric pressure and said fluid within said second bladder element is a gaseous substance.

3. An article of footwear according to claim 1 wherein said fluid contained in said first and second bladder elements is a gaseous substance, said gaseous substance contained in said second bladder element is at a pressure above atmospheric pressure and below the pressure of said gaseous substance contained in said first bladder element.

4. An article of footwear according to claim 1 wherein said fluid contained in said second bladder element is air, said air contained in said second bladder element being at a different pressure than said fluid contained in said first bladder element.

5. An article of footwear according to claim 1 further comprising an outer sole layer, a midsole layer disposed above said outersole layer having a top surface and a bottom surface, and a shoe upper attached above said top surface of said midsole layer.

6. An article of footwear according to claim 1 wherein said first bladder element is inflated with said fluid and permanently sealed, said fluid being a gaseous substance.

7. An article of footwear according to claim 1 wherein said second bladder element includes an inlet valve for inflating said second bladder element with said fluid.

8. An article of footwear according to claim 7 wherein said inlet valve is connectable to a pump external to said bladder composite.

9. An article of footwear according to claim 1 wherein a plurality of said depressions are formed in at least one of said top and bottom surfaces to define a plurality of chambers in said first bladder element, said fluid within said chambers being a gaseous substance at a pressure above atmospheric pressure.

10. An article of footwear according to claim 9 wherein said gaseous substance contained in said chambers is selected from the group consisting of hexafluoroethane; sulfur hexafluoride; perfluoropropane; perfluorobutane; perfluoropentane; perfluorohexane; perfluoroheptane; octafluorocyclobutane; perfluorocyclobutane; hexafluoropropylene; tetrafluoromethane; monochloropentafluoroethane; 1, 2-dichlorotetrafluroethane; 1, 1, 2-trichloro-1, 2, 2 trifluoroethane; chlorotrifluoroethylene; bromotrifluoromethane; and monochlorotrifluoromethane, and is at a pressure above 5 p.s.i., and said fluid contained in said second bladder element is a gaseous medium at a pressure below 15 p.s.i.

11. An article of footwear according to claim 10 wherein said gaseous medium contained in said second bladder element is air at atmospheric pressure.

12. An article of footwear comprising an upper and a sole; said sole including a bladder composite; said bladder composite comprising:

an outer bladder containing a cushioning and supportive fluid;

an inner bladder containing a cushioning and supportive fluid, said inner bladder including a plurality of chambers in fluid communication and having a plurality of surface depressions between adjacent said chambers, said inner bladder being completely encased within said outer bladder and said cushioning and supportive fluid in said outer bladder filling said plurality of surface depressions such that a generally smooth upper and lower surface is obtained;

wherein said inner bladder and said outer bladder are sealingly connected to define a common perimeter seal for said bladder composite and said bladder composite is capable of withstanding concentrated and repetitive high impact loads occurring with footstrike.

13. An article of footwear according to claim 12 wherein said fluid within said inner bladder is a gas, said inner bladder is inflated with said gas to a first predetermined pressure and permanently sealed with said pressurized gas therein.

14. An article of footwear according to claim 13 wherein said outer bladder is inflated with said fluid to a second predetermined pressure.

15. An article of footwear according to claim 14 wherein said fluid contained in said outer bladder is air, said outer bladder being inflated with the air.

16. An article of footwear according to claim 13 wherein said fluid contained in said outer bladder is air, said outer bladder being sealed to contain the air at atmospheric pressure.

17. A method of forming an article of footwear having a cushioning element comprising the steps of:

forming an upper and a sole;

forming a first bladder from an elastomeric material to form an interior cavity within a perimeter of the bladder and providing at least one depression in at least one of a top and bottom surface of the first bladder to constrain expansion;

forming a second bladder from an elastomeric material around said first formed bladder to thereby encase said first bladder within said second bladder;

inflating the first bladder with a first medium; and overlapping and sealing a perimeter of said second bladder around the perimeter of said first bladder and thereby preventing movement of said first bladder within said second bladder;

placing said bladders within said sole;

wherein the cushioning element is capable of withstanding concentrated and repetitive high impact loads occurring with footstrike.

18. A method of forming an article of footwear according to claim 17 wherein said first medium is a gas and said inflating step includes inflating the first bladder with said gas selected from the group consisting of hexafluoroethane; sulfur hexafluoride; perfluoropropane; perfluorobutane; perfluoropentane; perfluorohexane; perfluoroheptane; octafluorocyclobutane; perfluorocyclobutane; hexafluoropropylene; tetrafluoromethane; monochloropentafluoroethane; 1, 2-dichlorotetrafluroethane; 1, 1, 2-trichloro-1, 2, 2 trifluoroethane; chlorotrifluoroethylene; bromotrifluoromethane; and monochlorotrifluoromethane to a pressure above 5 p.s.i.

19. A method of forming an article of footwear according to claim 18 further comprising, after said forming the second bladder step, inflating the second bladder with a fluid medium.

20. A method of forming an article of footwear according to claim 18 wherein said sealing step includes sealing the second bladder to contain ambient air.

* * * * *